United States Patent [19]

Lanzer

[11] Patent Number: 4,923,029
[45] Date of Patent: May 8, 1990

[54] DRIVE MEANS FOR ALL-WHEEL-DRIVEN MOTOR VEHICLES

[75] Inventor: Heribert Lanzer, Gössendorf, Austria

[73] Assignee: Steyr-Daimler-Puch AG, Vienna, Austria

[21] Appl. No.: 109,943

[22] Filed: Oct. 19, 1987

[30] Foreign Application Priority Data

Oct. 21, 1986 [AT] Austria ............................... 2786/86

[51] Int. Cl.$^5$ ........................ B60K 17/34; F16H 1/44
[52] U.S. Cl. .................................. 180/248; 180/249; 475/86; 475/89
[58] Field of Search ............... 180/233, 247, 248, 249, 180/250; 74/710.5, 711, 701, 705

[56] References Cited

U.S. PATENT DOCUMENTS

| | | | |
|---|---|---|---|
| 3,760,922 | 9/1973 | Rolt et al. ............................ | 180/249 |
| 4,466,502 | 8/1984 | Sakai .................................. | 180/247 |
| 4,700,800 | 10/1987 | Friedrich et al. ................. | 180/248 X |
| 4,709,775 | 12/1987 | Watanabe et al. ................. | 180/233 |
| 4,714,129 | 12/1987 | Mueller .............................. | 180/248 |
| 4,723,624 | 2/1988 | Kawasaki et al. ............... | 180/248 X |
| 4,729,259 | 3/1988 | Lanzer ............................... | 180/249 X |
| 4,747,464 | 5/1988 | Lanzer ............................... | 180/248 |
| 4,747,643 | 5/1988 | Lanzer ............................... | 303/100 X |
| 4,750,382 | 6/1988 | Marc .................................. | 74/701 |
| 4,756,381 | 7/1988 | Renaudin ........................... | 180/249 |
| 4,787,269 | 11/1988 | Matsumoto ........................ | 180/247 X |
| 4,804,059 | 2/1989 | Sakakiyama ..................... | 180/247 X |

FOREIGN PATENT DOCUMENTS

| | | | |
|---|---|---|---|
| 3533142 | 4/1986 | Fed. Rep. of Germany . | |
| 3533143 | 4/1986 | Fed. Rep. of Germany ...... | 180/248 |
| 179425 | 10/1984 | Japan ................................... | 180/248 |
| 1357106 | 6/1974 | United Kingdom ................. | 74/711 |

Primary Examiner—Mitchell J. Hill
Attorney, Agent, or Firm—Marmorek, Guttman & Rubenstein

[57] ABSTRACT

An all-wheel driven motor vehicle capable of operating in an understeering or an oversteering condition comprises a front axle, a rear axle, and an interaxle differential comprising a planetary gear system, a releasable coupling, and a liquid friction coupling. The planetary gear system includes an input member connected to the motor of the vehicle, a first output member connected to the front axle, and a second output member connected to the rear axle. The releasable coupling interconnects the first and second output members. The liquid friction coupling is disposed between the first output member and the front axle. The three-torque transmitting members of the planetary gear system are selected so that when the releasable coupling is disengaged, the vehicle operates in an understeering condition under normal running conditions. When the releasable coupling engages the first and second output members together, the liquid friction coupling reduces the torque supplied to the front axle so that the vehicle operates in an oversteering condition.

8 Claims, 1 Drawing Sheet

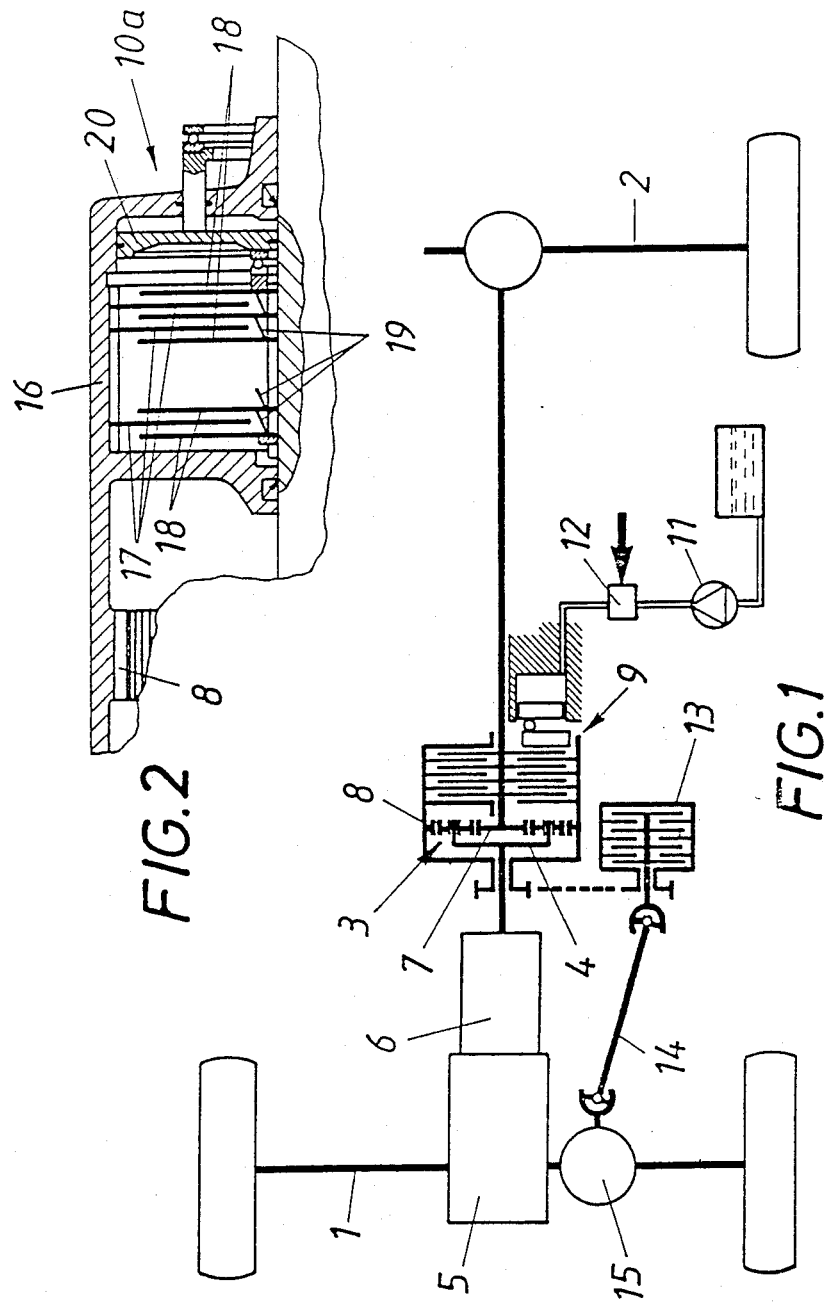

DRIVE MEANS FOR ALL-WHEEL-DRIVEN MOTOR VEHICLES

BACKGROUND OF THE INVENTION

1. Field of the Invention

This invention relates to drive means for all-wheel-driven motor vehicles comprising an interaxle differential which is interconnected between a front axle and a rear axle and comprises three torque-transmitting members consisting of an input member and two output members, and a releasable, preferably non-posivitve coupling interconnected between two of said members, said differential and coupling being adapted to maintain a ratio of the torque applied to the front axle to the torque applied to the rear axle in excess of the ratio of the dynamic axle load on the front axle to the dynamic axle load on the rear axle under normal running conditions of the vehicle, i.e., when the vehicle is running substantially straight ahead without wheel spinning or wheel locking.

2. Description of the Prior Art

The running characteristics of an all-wheel-driven motor vehicle comprising an interaxle differential interconnected between the front axle and the rear axle are decisively influenced by the distribution of the torques for driving the two axles. The vehicle will be understeered when the torque for driving the front axle, related to the dynamic axle load on the front axle, exceeds the torque for driving the rear axle, related to the dynamic axle load on the rear axle. An oversteering can be achieved in that the torque for driving the rear axle is relatively increased. An understeered vehicle can be more easily driven by an ordinary driver. An oversteered vehicle is preferred for a sportive driving.

It is already known (see FIG. 18 of British Patent Specification 1,357,106) to provide a liquid friction coupling, which constitutes a non-positive coupling that is associated with an interaxle differential interconnected between a front axle and a rear axle. When there is no wheel spinning, the torque ratio lies between a fixed value, which is determined by the design of the interaxle differential, and a ratio which is obtained in dependence on the dynamic distribution of the weight to the two axles.

In another known arrangement (see FIG. 17 of British Patent Specification 1,357,106), one of the two axles is non-rotatably connected to the output member of the speed-changing transmission driven by the engine, and the second axle is driven by means of a liquid friction coupling. In an arrangement in which the latter axle is the front axle whereas the rear axle is rigidly connected to the drive, the ratio of the torques for driving the two axles will be in a range between a transmission of torque only to the rear axle and a ratio which depends on the rati of the dynamic axle loads, provided that there is no excessive wheel slip.

Whereas the two known drive means discussed hereinbefore operate to vary the distribution of the torques for driving the two axles, that variation is effected only in a rather restricted range having limits which are defined, on the one hand, by the condition in which only the rear axle is driven and, on the other hand, on the torque distribution effected by the interaxle differential, and are also determined by the requirement that the torque ratio must exceed the ratio of the dynamic axle loads. A reversal of that relationship is not possible although this would be desired for a sportive driving.

SUMMARY OF THE INVENTION

It is an object of the invention to provide comparatively simple means for improving the drive means described first hereinbefore in such a manner that the distribution of the torques to the two axle will automatically be controlled in adaptation to the style of driving and to the running conditions of the vehicle.

The object is accomplished in accordance with the invention in that a liquid friction coupling is interconnected between the interaxle differential and the front axle. The interaxle differential and a second, release coupling are adapted to maintain the ratio of the torque applied to the front axle to the torque applied to the rear axle in excess of the ratio of the dynamic axle load on the front axle to the dynamic axle load on the rear axle when the vehicle is running under normal conditions.

When the non-positive coupling that is associated with the interaxle differential is released, the liquid friction coupling interconnected between the interaxle differential and the front axle will result in a slight increase of the speed of the means for transmitting torque from the interaxle differential to the liquid friction coupling but the distribution of torques will depend only on the action of the interaxle differential so that the vehicle will be understeered and will have a high directional stability when driving straight ahead, as is desired by an ordinary driver. On the other hand, when the coupling that is associated with the interaxle differential is fully effective, the action of the interaxle differential will be eliminated and a relatively higher torque will be applied to the rear axle because the front axle is driven via the liquid friction coupling. As a result, the vehicle will be oversteered, as is desired by a sportive driver. The coupling that is associated with the interaxle differential can be automatically controlled by sensors in response to various operating parameters, such as the engine output torque and the gear which has been engaged.

The operation will be simplified if the non-positive coupling that is associated with the interaxle differential consists of a preferably adjustable liquid friction coupling. In that case the two liquid friction couplings effectively constitute torque sensors and the characteristic of the liquid friction coupling associated with the interaxle differential can be arbitrarily adjusted.

BRIEF DESCRIPTION OF THE DRAWING

FIG. 1 is a diagrammatic representation of drive means embodying the invention.

FIG. 2 is a simplified axial sectional view showing a part of an adjustable liquid friction coupling.

DETAILED DESCRIPTION OF THE PREFERRED EMBODIMENTS

Two illustrative embodiments of the invention will now be explained more in detail with reference to the drawing.

An all-wheel-driven motor vehicle comprises a front axle 1 and a rear axle 2, which are interconnected by an interaxle differential consisting of a planetary gear train 3. The planet carrier 4 of the gear train 3 constitutes an input member and is driven by the engine 5 via a speed-changing transmission 6. The rear axle 2 is driven from the sun gear 7 and the front axle 1 is driven from the ring gear 8 of the gear train 3 ring gear 8 and sun gear 7 constituting first and second output members, respectively. Two of the three torque-transmitting members 4, 7, 8 of the planetary gear train or interaxle differential 3, specifically the ring gear 8 and the sun gear 7, which rotate in the same sense, are interconnected by a releasable, non-positive coupling, which in accordance with the lower half of FIG. 1 consists of a multiple-disc coupling 9 or a liquid friction coupling. The multiple-disc coupling 9 is controlled by means of a pump 11 via a control valve 12, which is controlled in dependence on various input parameters.

In accordance with the invention the means for transmitting torque from the interaxle differential 3 to the front axle 1 comprise a liquid friction coupling 13, which is connected by a universal-joint shaft 14 to the differential 15 of the front axle 1.

In another embodiment the non-positive coupling that is associated with the interaxle differential 3 may consist of an adjustable liquid friction coupling 10a, such as is shown in FIG. 2. The housing 16 of that liquid friction coupling 10a is non-rotatably connected to the ring gear 8 of the planetary gear train 3 and carries the outer discs 17. The inner discs 18 of the coupling 10a are non-rotatably connected to the shaft which connects the sun gear 7 to the rear axle 2. Expanding springs 19 are disposed between the inner discs 18. Against the force of said expanding springs 19 the inner discs 18 can be displaced toward each other by means of a piston 20 so that the distance between adjacent outer and inner discs 18, 17 is reduced and the characteristic of the coupling 10a will be altered.

What is claimed:

1. Drive means for an all-wheel driven motor vehicle having a front axle and a rear axle, which drive means comprises:
   an interaxle differential comprising a planeteary gear system having three torque-transmitting members including an input member, a first output member connected to said front axle, and a second output member connected to said rear axle,
   a releasable coupling interconnecting said first and second output members, and
   a second coupling disposed between said first output member and said front axle, said second coupling being a liquid friction coupling,
   said three torque transmitting members being selected so that when said releasable coupling is disengaged, the ratio of the torque applied to said front axle to the torque applied to said rear axle is in recess of the ratio of the axle load on said front axle to the axle load on said rear axle under normal running conditions, and the vehicle operates in an understeering condition, and
   said second coupling reducing the torque applied to said front axle when said releasable coupling engages said first and second output members together so that the ratio of the torque applied to said front axle to the torque applied to said rear axle is less than the ratio of the axle load on said front axle to the axle load on said rear axle, and the vehicle operates in an oversteering condition.

2. The drive means set forth in claim 1 wherein said releasable coupling interconnected between said first and second output members is a non-positive coupling.

3. The drive means set forth in claim 2, wherein said non-positive coupling comprises a second liquid friction coupling.

4. The drive means set forth in claim 3, wherein said second liquid friction coupling is adjustable.

5. The drive means set forth in claim 1 as applied to drive means in which said releasable coupling is interconnected between two of said torque-transmitting members which are arranged to rotate in the same sense.

6. An all-wheel drive motor vehicle comprising:
   a front axle,
   a rear axle; and
   an interaxle differential comprising a planetary gear system having three torque-transmitting members including an input member, a first output member connected to said front axle, and a second output member connected to said rear axle,
   a releaseable coupling interconnecting said first and second output members, and
   a second coupling disposed between said first output member and said front axle, said second coupling being a liquid friction coupling,
   said three torque transmitting members being selected so that when said releasable coupling is disengaged, the ratio of the torque applied to said front axle to the torque applied to said rear axle is in excess of the ratio of the axle load on said front axle to the axle load on said rear axle under normal running conditions, and the vehicle operates in an understeering condition, and
   said second coupling reducing the torque applied to said front axle when said releasable coupling engages said first and second output members together so that the ratio of the torque applied to said front axle to the torque applied to said rear axle is less than the ratio of the axle load on said front axle to the axle load on said rear axle, and the vehicle operates in an oversteering condition.

7. The all-wheel-driven motor vehicle set forth in claim 6, wherein said releasable coupling interconnected between said first and second output members is a liquid friction coupling.

8. The all-wheel-driven vehicle set forth in claim 6 as applied to a motor vehicle in which said releasable coupling is interconnected between two of said torque-transmitting members which are arranged to rotate in the same sense.

* * * * *